(12) United States Patent
Hasegawa

(10) Patent No.: US 8,110,140 B2
(45) Date of Patent: Feb. 7, 2012

(54) METHOD OF MANUFACTURING CERAMIC OPTICAL COMPONENTS

(75) Inventor: Masato Hasegawa, Itami (JP)

(73) Assignee: Sumimoto Electric Industries, Ltd., Osaka (JP)

( * ) Notice: Subject to any disclaimer, the term of this patent is extended or adjusted under 35 U.S.C. 154(b) by 392 days.

(21) Appl. No.: 10/469,219

(22) PCT Filed: Dec. 25, 2002

(86) PCT No.: PCT/JP02/13494
§ 371 (c)(1),
(2), (4) Date: Aug. 27, 2003

(87) PCT Pub. No.: WO03/055826
PCT Pub. Date: Jul. 10, 2003

(65) Prior Publication Data
US 2004/0212107 A1 Oct. 28, 2004

(30) Foreign Application Priority Data

Dec. 26, 2001 (JP) ................................. 2001-393035

(51) Int. Cl.
*B28B 3/00* (2006.01)
*C04B 35/64* (2006.01)
(52) U.S. Cl. ......... 264/663; 264/664; 264/603; 264/653
(58) Field of Classification Search .................. 264/603, 264/604, 653–668
See application file for complete search history.

(56) References Cited

U.S. PATENT DOCUMENTS

| | | | | |
|---|---|---|---|---|
| 4,098,596 A | * | 7/1978 | Wu | 65/30.12 |
| 4,591,482 A | * | 5/1986 | Nyce | 419/38 |
| 4,732,719 A | * | 3/1988 | Panda et al. | 264/664 |
| 4,849,142 A | * | 7/1989 | Panda et al. | 264/40.6 |
| 4,871,496 A | * | 10/1989 | Panda et al. | 264/122 |
| 4,882,827 A | * | 11/1989 | Kusumi et al. | 29/527.2 |

(Continued)

FOREIGN PATENT DOCUMENTS

EP 0577427 A1 1/1994

(Continued)

OTHER PUBLICATIONS

Machine translation of JP 06024828 A as obtained from http://www4.ipdl.ncipi.go.jp/cgi-bin/tran_web_cgi_ejje on Apr. 20, 2006.*

(Continued)

*Primary Examiner* — Jason L. Lazorcik
(74) *Attorney, Agent, or Firm* — James W. Judge

(57) ABSTRACT

In methods of manufacturing optical components for infrared-light or ultraviolet-light applications, by lessening the expense consumed during finishing processes, a technique for manufacturing ceramic optical components inexpensively is realized. Raw material powders whose main constituent is ZnS, ZnSe or Ge, for ceramics for infrared-light optical components, and whose main constituent is $CaF_2$ or $MaF_2$, for ceramics for ultraviolet-light optical components, are molded into molded masses; the molded masses are sintered into sinters; and by pressing the sinters through a heating and compressing process, net-shape ceramic sinters can be produced. Alternatively, a finishing process is carried out after they are pressed into near-net shape. By shaping into net shape or near-net shape, the finishing process can be omitted, or the finishing process time and processing expense taken up can be decreased.

23 Claims, 2 Drawing Sheets

U.S. PATENT DOCUMENTS

| | | | | |
|---|---|---|---|---|
| 4,961,778 A | * | 10/1990 | Pyzik et al. | 75/230 |
| 5,001,093 A | | 3/1991 | Roy et al. | |
| 5,143,540 A | * | 9/1992 | Pyzik et al. | 75/233 |
| 5,171,348 A | * | 12/1992 | Umetani et al. | 65/374.11 |
| 5,575,959 A | * | 11/1996 | Harris et al. | 264/1.21 |
| 5,816,090 A | * | 10/1998 | Hodge et al. | 72/56 |
| 6,096,111 A | * | 8/2000 | Polese et al. | 75/228 |
| 6,111,689 A | * | 8/2000 | Shibata | 359/356 |
| 6,863,842 B2 | * | 3/2005 | Hasegawa | 252/584 |
| 2004/0212107 A1 | * | 10/2004 | Hasegawa | 264/1.21 |

FOREIGN PATENT DOCUMENTS

| | | | |
|---|---|---|---|
| JP | H01-55213 B2 | | 11/1898 |
| JP | S41-412 | | 1/1966 |
| JP | S58-88178 A | | 5/1983 |
| JP | H05-43359 A | | 2/1993 |
| JP | 06024828 A | * | 2/1994 |
| JP | H07-69742 A | | 3/1995 |
| JP | H11-295501 A | | 10/1999 |

OTHER PUBLICATIONS

ZincSulfide, Aldrich Catalog Excerpt (CAS No. 1214-98-3)—Demonstrates that ZnS powder of 99.99% purity and comprising <1% of material other than ZnS is commercially available.*

* cited by examiner

METHOD OF MANUFACTURING CERAMIC OPTICAL COMPONENTS

TECHNICAL FIELD

The present invention relates to optical components that transmit infrared or ultraviolet light, and relates in particular to methods of manufacturing infrared or ultraviolet optical components.

BACKGROUND ART

The development of novel high-performance devices that exploit especially advantageous capabilities had with infrared light and ultraviolet light is ongoing. For instance, advantage is taken of infrared sensing capabilities in practical applications including, to name examples: surface thermometers for non-contact measurement of the surface temperature of an object; resource-probing systems for sensing terrestrial resource distribution from the upper atmosphere; devices for dark-field detection of objects; sensors for detecting human presence, and security systems employing such sensors; and gas-analyzing equipment. Along with the practical realization of these sorts of high-performance infrared-light and ultraviolet-light exploiting devices have been increasing demands for advanced working capabilities from, and cost reductions in, the optically functioning components—for example, various optical components such as window elements and lens elements—incorporated into such devices.

In a conventional method of manufacturing the window elements and lens elements, raw-material powders are mixed together and molded into a predetermined form, then sintered into a sintered body that is furthermore finished to work it into intended form.

The finishing work is carried out by means of grinding and polishing machining processes, but because the work is usually done by milling off ceramic sinters, the finishing-process costs have proven to be very high. In particular, cases in which shapes such as those of aspherical lenses are produced require ultra-precision turning on ultra-precision lathes, and thus have meant high processing costs. At the same time, since the milling is ordinarily off cylindrical workpieces, the cost of disposing of the sinter material is very large, meaning that expenditure for the sinter material that is discarded is also high and as a result that the optical components in their net shape are extremely costly.

In an attempt to reduce such costs, a method of forming an optical element having a density of 99% or more, utilizing a mold employed when molding and sintering, which has been made into net shape, to mold ZnS powder under a vacuum or an inert gas is set out in Japanese Pat. Pub. No. S41-412. Nevertheless, a problem has been that the method requires changing molds, and that productivity is poor, in that with fracturing and chipping being liable to occur when changing molds or handling for transport, because the strength of molded articles in which no binder is used is inferior, yields are poor. Another problem has been that when heating and pressing are performed simultaneously, moreover, impurities within the raw material are prone not to come out, and if raw materials with consequently many impurities are used, products of inferior transmittance are all that will be produced. Lastly, a problem has been that inasmuch trying to rid the articles of impurities means having to prolong the heating time, productivity drops.

An object of the present invention is in respect of infrared-light or ultraviolet-light optical components to eliminate problems like the foregoing and realize a method of inexpensively manufacturing infrared or ultraviolet optical components, such as window elements and lenses, whose infrared- or ultraviolet-light transmittance is favorable. The present invention makes it possible inexpensively to produce, while allowing finishing processes not to be done or at least the expense they consume lessened, ultrafine ceramic optical components of excellent infrared- or ultraviolet-light transmittance.

Materials for infrared optical components and ultraviolet optical components have to date been regarded difficult to alter in form after sintering. The present inventors discovered that by sintering a material in advance until a certain level of pores remain, a propensity to conform to shape alteration, exploiting the pores contained in the sintered body, could be made manifest utilizing a hot press. They also discovered that optimally selecting pore diameter and pore percentage according to the amount by which the form is altered, and optimizing heating temperature, pressing and deforming speed and pressing pressure enables the reshaping of infrared-optical-component and ultraviolet-optical-component materials until net shape to make them into minutely fine sintered bodies, whereby sinters whose infrared- or ultraviolet-light transmittance is excellent and mechanical strength is superior can be produced.

DISCLOSURE OF INVENTION

The present invention provides for: a molding step of molding a ceramic raw-material powder into a green body; a sintering step of sintering the green body into a sintered body; and a pressing step of pressing and deforming the sintered body into net shape. The fact that the piece is pressed until net shape means that finishing work that conventionally has been carried out is unnecessary, which therefore can significantly reduce material and processing costs.

The present invention provides for: a molding step of molding a ceramic raw-material powder into a green body; a sintering step of sintering the green body into a sintered body; a pressing step of pressing and deforming the sintered body into a form that is near-net shape; and a finishing-process step of finishing the piece into net shape. The cost consumed by the finishing process to render the net shape decreases significantly thanks to the piece being pressed and deformed into a form that is near-net shape, whereby the material and processing expenses can be reduced considerably. A hot press is preferably utilized for pressing.

In the present invention the fact that, as stated above, after molding a powder and making it into a sintered body, thereafter the sintered body is pressed to alter its form enables the concentration of impurities to be reduced in the sintering step, making it possible to utilize inexpensive raw materials with a large amount of impurities. By the same token, the fact that the sintering is done in advance facilitates handling. What is more, the time required for pressing is shortened, therefore making enhanced yields and productivity possible.

The relative density of the sintered body in the above-noted sintering step is preferably 50-99%, more preferably, 55-80%. In the step of pressing and deforming into net shape, heating and pressing are carried out, but preferably the material is heated first and is compressed once its temperature has gone to 30% or more of the melting point.

The pressure in the abovementioned pressing step is preferably 1 MPa or more and 300 MPa or less. The temperature finally reached in the pressing step mentioned above is preferably 30% or more of the melting point of the ceramic optical-component material, and below its melting or its sublimation point; more preferably the temperature is 35% or more of the melting point, and 95% or less of the melting or sublimation point. Temperatures less than 30% of the melting point are unadvisable, because they can give rise to fissures while pressing. Temperatures less than 35% of the melting point are uneconomical because they make the pressing and deforming speed extremely slow. On the other hand, exceeding the melting or sublimation point is undesirable because melting or sublimation sets in. Likewise, if 95% of the melting point or else the sublimation point is exceeded grains develop, deteriorating the mechanical strength.

The pressing and deforming speed in the above-noted pressing step is preferably 0.1 mm/min or more and 10 mm/min or less. Moreover, the speed at which the pressure is increases is preferably less than 15 kPa/s or more and 1 MPa/s or less.

BEST MODE FOR CARRYING OUT THE INVENTION

Figure 1:
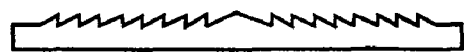
FIG. 1 illustrates a single example of a net shape according to the invention.

Ceramics whose infrared-light linear transmittance is high—for example, ceramics whose main constituent is zinc sulfide (ZnS), zinc selenide (ZnSe), barium fluoride ($BaF_2$), and gallium arsenide (GaAs), well as polycrystalline forms of silicon (Si) and germanium (Ge)—can be utilized as ceramics in the present invention. Among these, ZnSe or Ge, and ceramics whose main constituent is ZnS, are desirable for their inexpensiveness and superior optical transmission characteristics. More preferable still in terms of inexpensiveness, superior transmission characteristics, and practical strength and resistance to the elements is ZnS.

Furthermore, additives to screen out light of wavelengths 3 μm and under as needed may be incorporated into the ceramics just mentioned. Such additives may be one type, or two or more types, of elemental substances or compounds thereof selected from: iron, cobalt, silver, ferric oxide, carbon black, graphite, diamond, titanium black, copper, nickel, chrome, gold, manganese, molybdenum, tungsten, silicon and germanium.

Likewise, ceramics whose ultraviolet-light linear transmittance is high—for example, polycrystalline forms of calcium fluoride ($CaF_2$), magnesium fluoride ($MaF_2$), lithium fluoride (LiF), zirconium oxide ($ZrO_2$), spinel ($MgAl_2O_4$) and quartz ($SiO_2$)—can be utilized.

A method of manufacturing an optical component according to the present invention provides for steps of: initially mixing into a main constituent raw-material powder an additive powder as needed, of a kind as just described; thereafter molding the mixture into a predetermined shape, and sintering it into a sintered body; and further, pressing and deforming the sintered body into a net shape. Instead, the sintered body may be pressed and deformed into a form near-net shape, and then subject to a finishing process.

After the ceramic powders are molded, they are sintered under conditions correspondingly appropriate to the respective ceramic main constituents. Nevertheless, because the shape-alteration conformance of the sintered body if densified will not turn out well in the later pressing step, the relative density of the sinter is preferably 50% or more and 99% or less. Getting the relative density of the sinter to be within a range along these lines exploits the pores within the sinter to bring out conformance to shape alteration. The relative density more preferably is 55% or more and 80% or less. At less than 50% the piece being pressed is not likely to turn out ultrafine; at less than 55% the strength of the piece being pressed proves to be inferior. Likewise, if the relative density is in excess of 99%, the shape-alteration conformance turns extremely poor; if in excess of 80%, the pressing and deforming speed proves to be slow.

In this procedure, moreover, averting to the extent possible the admixing of impurities is advisable. For example, fabrication of the green body, and granulation carried out in order to enhance the filling properties of the powders that are mixed, desirably are done under a dry system in a way that does not require any organic binder. This means for example that the molding desirably is carried out using isostatic or uniaxial-die press molding systems. It is furthermore desirable to give consideration to the containers and heating atmosphere during sintering so as not to alter the properties of the ceramic.

The sintering may be pressureless sintering, or may be a pressure-sintering technique such as hot pressing in a mold or hot isostatic pressing (HIP). Although producing ultrafine-grained sinters by pressureless sintering is difficult, it will be understood that a method according to the present invention can ultimately yield an ultrafine-grained sinter, which ties in with curtailing costs.

A sinter obtained as in the foregoing is pressed and deformed into the net shape of the intended optical component. Alternatively, it is pressed and deformed into a form near-net shape, and put through a finishing process. For example, if the form is to be like in FIG. 1, that of a Fresnel lens employed in infrared sensors, a disk-shaped sintered body is produced with the mold during sintering being circular in a predetermined diameter; then a Fresnel lens shape can be obtained by setting the sinter into a mold of form transferring the Fresnel lens contour, raising the temperature, and then pressing the sinter to get it to follow the mold. Further, a finishing process may be performed on the periphery by machining it.

Figure 2:
FIG. 2 illustrates another single example of a net shape according to the invention.
Figure 3:
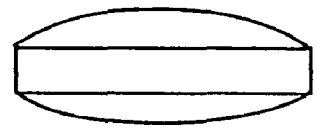
FIG. 3 illustrates a single example of the shape of a green body in a case, according to the invention, where the form in FIG. 2 is produced.

Again for example, if the form is to be like in FIG. 2, that of a convex lens, a sintered body of a form like in FIG. 3, close to that of the convex lens, is produced, and then a convex lens shape can be obtained by pressing the sinter utilizing a mold of form transferring the convex lens contour. If needed, a finishing process employing a spherical polisher or an ultra-precision lathe is carried out. By the same token, after being produced a disk-shaped sinter can be pressed and deformed into a shape like in FIG. 2.

Heating and pressing are necessary in order to transform the shape of the sinter. The pressing and heating are preferably within a vacuum or inert gas as the atmosphere. The heating temperature for pressing is preferably 30% or more of the melting point, and the melting or sublimation point or less, of the material. More preferably the temperature is 35% or more of the melting point, and 95% or less of the melting or sublimation point. For example, in the case of a ceramic whose main constituent is ZnS, a range of 550° C. or more and 1200° C. or less is preferable, and of 650° C. or more and 1100° C. or less is more preferable. Less than 550° C. is unadvisable because fissures can arise while pressing. Less than 650° C. is uneconomical because the pressing and deforming speed grows extremely slow. Temperatures in excess of 1200° C., on the other hand, are unadvisable because they cause the sinter to sublimate. If 1100° C. is exceeded, the mechanical strength deteriorates due to ZnS grains developing.

The compression pressure is preferably in a 1 to 300 MPa range. Where the pressure is lower than 1 MPa, producing ultrafine sinters proves to be difficult. On the other hand, pressure in excess of 300 MPa is unadvisable because it can destroy the mold, depending on the substance of the mold employed. The pressure is preferably 20 MPa or more and 200 MPa or less. Less than 20 MPa is uneconomical because the pressing and deforming speed grows extremely slow. If the pressure is in excess of 200 MPa, the sinter is likely to be destroyed. Although the onset of compression may follow on reaching the pressing temperature just mentioned, compression may be started in the course of temperature elevation. Where compression is to be begun in the course of temperature elevation, that compression follows on reaching 550° C. or more is advisable in the case of ZnS, because fissuring will not appear in the sinter.

The compression speed is, moreover, crucial. In particular, in a case where pressing is by lowering an upper ram, the compression speed is the speed at which the upper ram falls, and is preferably in a 0.1 to 10 mm/min range. Speeds slower than 0.1 mm/min are uneconomical because of the required time it takes for pressing. On the other hand, exceeding 10 mm/min is unadvisable because the sinter can break while being pressed and deformed into shape. More preferable is a speed of from 0.2 to 5 mm/min. At speeds of less than 0.2 mm, grains develop while pressing, deteriorating the mechanical strength. Likewise, pores are liable to remain if the speed is over 5 mm/min, making it hard to density the sinter.

In addition, the compression speed may be defined as the pressure-increasing speed. In these terms the speed preferably is 15 kPa/s or more and 1 MPa/s or less. Compression is by pressing in a range along these lines up until the finally attained pressure. The compression more preferably is 30 kPa/s or more and 700 kPa/s or less. Speeds of less than 15 kPa/s are uneconomical because of the required time it takes for pressing. On the other hand, exceeding 1 MPa/s is unadvisable because the sinter can break while being pressed and deformed into shape. At speeds of less than 30 kPa/s, grains develop while pressing, deteriorating the mechanical strength. Likewise, pores are liable to remain if the speed is over 700 MPa/s, making it hard to density the sinter.

Glassy carbon, graphite, cemented carbide, or ceramics of superior high temperature strength such as SiC, $B_4C$, $Si_3N_4$, cBN and diamond, can be utilized as the substance for the mold employed for pressing. Furthermore, diamond-like carbon (DLC), chromium nitride (CrN), or Pt, Ir, TiN, etc. may be coated onto the mold, with the object of improving mold separability.

First Embodiment

A material composed of a ceramic in which ZnS is made the main constituent was prepared as the ceramic base material. A powder consisting of ZnS, and whose average particle diameter was 1 μm and purity was 99.7%, was prepared as the raw material for the main constituent. Iron powder of 2 μm average particle diameter and not less than 98.2% purity, cobalt powder of 1 μm average particle diameter and not less than 99.9% purity, and $Fe_3O_4$ powder of 0.5 μm average particle diameter and not less than 99.7% purity were prepared as additives. 0.2 wt. % iron powder, 0.2 wt. % cobalt powder, and 0.01 wt. % $Fe_3O_4$ powder were blended with the ZnS powder, and the blend was ball-mill mixed 20 hours under a dry system.

Figure 7:
FIG. 7 illustrates a single example of the shape of a green body in a case, according to the invention, where the form in FIG. 5 is produced.

Thereafter the mixed powder was charged into a rubber mold while the mold was shaken, and then the mold was capped with a rubber lid and sealed by vacuum-degassing. The mold was put into an isostatic press, and the mixed powder was isostatically molded under 98 MPa pressure into the shape in FIG. 7. The relative densities of the bodies molded were 50 to 55%.

Subsequently the green bodies were sintered 5 hours at a temperature of 600° C. employing an ordinary vacuum furnace. The sinters were of 60 to 70% relative density, but were not densified. Furthermore, a mold made of glassy carbon, and of form for transferring the contour in FIG. 5, was set into a compression and heating press, and the sinters produced were set within the mold. Then, initially a vacuum was drawn on the entire mold, which was thereafter heated to the pressing temperatures set forth in Table I. After reaching its temperature, each sinter was gradually transformed in shape by pressing it at a speed of 0.4 mm/min; finally a pressure of 34 MPa (350 kg/cm$^2$) was applied and maintained for a 5-minute interval in order to conform the sinter to the shape of the carbon mold and to density it. The total time the sinters were kept at the pressing temperatures was 13 minutes. On taking the sinters out of the mold after decompressing it and lowering its temperature, each had taken on the shape in FIG. 5. It will be appreciated that no cracks or fissures were present. The surface roughness of the sinters was measured with a with a stylus profilometer; the relative density, by the underwater technique; the transmittance at a wavelength of 10 μm, with an infrared spectrophotometer; the weight reduction, from the difference between the sinter weight and post-pressing weight; and the four-point bending strength in accordance with JIS R1601. These results are tabulated and set forth in Table I.

TABLE I

| No. | Pressing temperature (° C.) | Surface roughness (Ra) | Relative density (%) | Transmittance (%) | Weight reduction (%) | Strength (Mpa) |
| --- | --- | --- | --- | --- | --- | --- |
| 1 | 500 | 0.3 | 70.0 | 40 | 0.05 | 70 |
| 2 | 800 | 0.027 | 98.6 | 60 | 0.1 | 90 |
| 3 | 900 | 0.01 | 99.2 | 70 | 0.2 | 95 |
| 4 | 950 | 0.008 | 99.5 | 75 | 0.5 | 93 |
| 5 | 975 | 0.005 | 99.8 | 75 | 1.0 | 90 |
| 6 | 1000 | 0.006 | 99.5 | 70 | 1.0 | 87 |
| 7 | 1150 | 0.01 | 99.0 | 50 | 3.0 | 70 |
| 8 | 1250 | 0.5 | 60.0 | 30 | 30 | 65 |

As is evident from Table I, after pressureless sintering, heating in a temperature range of 550 to 1200° C. and pressing the sinter transforms it so that it follows the mold contour, and at the same time serves to density the sinter. As a result, transmittance at 10 μm wavelength that with pressureless sintering as such had been less than 50% can be improved to be 60% or more by means of the present invention. What is more, by densifying the sinters to a relative density of 99% or more, their post-pressing surface roughness turns out to be roughly the surface roughness of the mold employed. Polishing or like finishing processes can consequently be omitted by adjusting the surface roughness of the mold employed. Further evident was the fact that at temperatures in excess of 1200° C., the weight reduction was 30%, and sublimation of the ZnS occurred.

Second Embodiment

Utilizing the same powder as in Embodiment 1, molding and sintering were carried out likewise as with Embodiment 1. Sinters were pressed utilizing the same mold employed in Embodiment 1. In pressing the sinters, when they had become the temperatures shown in Table II the upper ram was lowered at a speed of 5 mm/min to compress the sinters to a pressure of 57 MPa. The sinters continued to be heated while being compressed at 57 MPa, being heated until 900° C. finally. Once the stroke could go no further, it was maintained for 5 minutes in order to conform the sinters to the mold shape and densify them. Results were that from 500° C. down the compressed articles cracked. There were no cracks in articles compressed at temperatures of 500° C. or more. The speeds at which articles in which there were no cracks were pressed are shown in Table II. Likewise as with Embodiment 1, the results of measuring the relative density, transmittance, weight reduction, and four-point bending strength were also tabulated and are entered in Table II.

TABLE II

| No. | Temperature (° C.) | Pressing and deforming speed (mm/min) | Relative density (%) | Transmittance (%) | Weight reduction (%) | Strength (Mpa) |
| --- | --- | --- | --- | --- | --- | --- |
| 9 | 500 | — | — | — | — | — |
| 10 | 600 | 0.15 | 99.5 | 72 | 0.1 | 95 |
| 11 | 700 | 0.7 | 99.8 | 75 | 0.1 | 95 |
| 12 | 800 | 0.7 | 99.8 | 75 | 0.1 | 95 |

Third Embodiment

Molding, sintering and pressing were carried out in the same manner as with Embodiment 2. However, when the sinters had become the temperatures shown in Table III, they were compressed to a pressure of 34 MPa at a speed of 5 mm/min. The sinters continued to be heated while being compressed at 34 MPa; and after being heated until 1000° C. finally, they were maintained for 5 minutes as in Embodiment 2. Results were that from 500° C. down the compressed articles cracked. There were no cracks in articles compressed at temperatures of 500° C. or more. The speeds at which articles in which there were no cracks were pressed are shown in Table III. Likewise as with Embodiment 1, the results of measuring the relative density, transmittance, weight reduction, and four-point bending strength were also tabulated and are entered in Table III.

TALBLE III

| No. | Temperature (° C.) | Pressing and deforming speed (mm/min) | Relative density (%) | Transmittance (%) | Weight reduction (%) | Strength (Mpa) |
| --- | --- | --- | --- | --- | --- | --- |
| 13 | 500 | — | — | — | — | — |
| 14 | 600 | 0.1 | 99.4 | 70 | 0.1 | 95 |
| 15 | 700 | 0.4 | 99.7 | 75 | 0.1 | 95 |
| 16 | 800 | 0.4 | 99.7 | 75 | 0.1 | 95 |

It is evident from the results in Tables II and m that with there not being any cracking if compression is carried out at temperatures of 550° C. and more, pressing can be done favorably, but that at 600° C. the productivity is not good because the pressing and deforming speed is extremely slow. Also, pressing and deforming speeds for which the compression pressure is higher prove to be faster, enabling productivity to be further improved. Further, comparing No. 6 in Embodiment 1 and No. 16 in Embodiment 3, it is evident that with a 5 minute-interval being the duration for which No. 16 was kept at 1000° C., and the same 1000° C. being the final temperature in pressing, in that pressing in the course of raising the temperature shortens the holding time at the final temperature to further improve the productivity and enhance the post-pressing relative density and transmittance, ceramic optical components of superior mechanical strength can be produced.

Fourth Embodiment

ZnS powder of 99.7% purity and an average particle diameter of 2 μm was prepared as a raw material powder and was molded into the shape in FIG. 3 by molding in a uniaxial die press. Such green bodies were sintered utilizing an ordinary vacuum furnace under the temperature and time conditions indicated in Table IV. The post-sintering relative densities are tabulated and entered in Table IV.

The sinters obtained were set in a mold made of carbide and of form for transferring the shape in FIG. 2, and were heated and compressed under the pressing temperature conditions set forth in Table IV. Here, heating was carried out likewise as with Embodiment 1, and compression, by lowering the upper ram at a speed of 0.3 mm/min, and the sinters were pressed and after reaching final peak pressure (34 MPa) were kept there 30 minutes. The result was that sinters having the FIG. 2 contour could be produced under any of the conditions. The post-pressing impurity concentration in the sinters; the weight reduction measured likewise as with Embodiment 1; and the 10 μm-wavelength transmittance and the relative density are set forth in Table V.

TABLE IV

| No. | Sintering Temperature (° C.) | Time (Hr) | Sinter relative density (%) | Pressing Temperature (° C.) |
| --- | --- | --- | --- | --- |
| 17 | 300 | 3 | less than 50% | 900 |
| 18 | 400 | 8 | 50-60 | 900 |
| 19 | 500 | 5 | 50-60 | 900 |
| 20 | 600 | 5 | 60-70 | 900 |
| 21 | 800 | 3 | 60-70 | 900 |
| 22 | 900 | 10 | 70-80 | 950 |
| 23 | 950 | 9 | 70-80 | 1000 |
| 24 | 1000 | 15 | 80-90 | 1100 |
| 25 | 1100 | 10 | 80-90 | 1150 |
| 26 | 1250 | 10 | less than 50% | 1250 |

TABLE V

| No. | Impurity Concentration (wt %) | Weight reduction (%) | Transmittance (%) | Relative density (%) |
| --- | --- | --- | --- | --- |
| 17 | >3 | 0.0 | 40 | 99.5 |
| 18 | 1.0 | 0.1 | 60 | 99.5 |
| 19 | 0.1 | 0.5 | 70 | 99.7 |
| 20 | 0.05 | 1.0 | 75 | 99.9 |
| 21 | 0.03 | 2.0 | 75 | 99.9 |
| 22 | 0.02 | 3.0 | 75 | 99.7 |
| 23 | 0.02 | 4.0 | 72 | 99.5 |
| 24 | 0.01 | 5.0 | 65 | 99.2 |
| 25 | 0.01 | 8.0 | 60 | 99.0 |
| 26 | 0.01 | 30.0 | 30 | 60.0 |

As is evident from Table V, sintering at 300° C. left a great amount of impurities remaining. This would seem to be because dissociation of the $SO_x$ that is principal impurity in ZnS did not proceed. Sintering at 1250° C. led to a large 30% weight reduction due to sublimation. It is evident that articles sintered at 1000° C. from 500° C., and pressed at 1100° C. from 900° C. have a transmittance of 60% or more and exhibit useful transmission properties.

Fifth Embodiment

ZnS powder of 99.9% purity and an average particle diameter of 1.2 μm was prepared as a raw material powder and was molded, in the same manner as with Embodiment 1, into disk shapes. The green bodies were sintered 3 hours at 800° C. utilizing a vacuum furnace. The relative densities of the sinters obtained were 60 to 70%. The sinters were set in a mold made of SiC and of form for transferring the shape in FIG. 5, and from 700° C. on in the course of raising the temperature to a final 900° C., were compressed under the pressures set forth in Table VI. The post-sintering relative densities and the pressing and deforming speeds during pressing are tabulated and entered in Table VI.

TABLE VI

| No. | Pressure (MPa) | Relative density (%) | Pressing and deforming speed (mm/min) | Remarks |
| --- | --- | --- | --- | --- |
| 27 | 500 | — | — | Mold breakage |
| 28 | 300 | — | — | Sinter fissures |
| 29 | 200 | 99.9 | 0.7 | |
| 30 | 120 | 99.9 | 0.7 | |
| 31 | 80 | 99.8 | 0.7 | |
| 32 | 35 | 99.7 | 0.4 | |
| 33 | 20 | 99.5 | 0.4 | |
| 34 | 1 | 95.0 | 0.1 | |
| 35 | 0.5 | 80.0 | 0.08 | |

According to Table VI, if the pressure exceeds 200 MPa, failures arise in that fissures appear in the sinter, or else the SiC mold breaks. Favorable pressing was done at any pressure of 200 MPa or less, but at less than 20 MPa the pressing and deforming speed became extremely slow, worsening productivity. At less than 1 MPa, furthermore, ultrafine sinters could not be produced.

Sixth Embodiment

Figure 8:
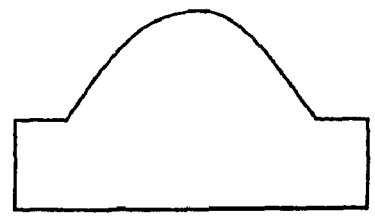
FIG. 8 illustrates another single example of the shape of a green body in a case, according to the invention, where the form in FIG. 5 is produced.

ZnS powder of 99.9% purity and an average particle diameter of 1.2 μm was prepared as a raw material powder and was molded, in the same manner as with Embodiment 1, into the shape in FIG. 8. The green bodies were sintered 3 hours at 800° C. utilizing a vacuum furnace. The relative densities of the sinters obtained were 60 to 70%. The sinters were set in a mold made of SiC and of form for transferring the shape in FIG. 5. As a result of pressing, from 750° C. on in the course of raising the temperature to 1000° C., at the pressing and deforming speeds set forth in Table VII, pressing halted at the point when any of the sinters had been compressed to 60 MPa, and therefore they were then kept at that point for 1 minute, and thereafter decompressed, lowered in temperature, and taken out of the mold. Results of measuring relative densities and mechanical strength likewise as with Embodiment 1 are set forth in Table VII.

TABLE VII

| No. | Pressing and deforming speed (mm/min) | Relative density (%) | Pressure (MPa) |
| --- | --- | --- | --- |
| 36 | 20 | — | — |
| 37 | 10 | 90.0 | 90 |
| 38 | 5 | 99.0 | 93 |
| 39 | 2.5 | 99.5 | 95 |
| 40 | 1.5 | 99.7 | 95 |
| 41 | 0.5 | 99.8 | 95 |
| 42 | 0.2 | 99.9 | 93 |
| 43 | 0.1 | 99.9 | 87 |
| 44 | 0.05 | 99.9 | 70 |

At a pressing and deforming speed of 20 mm/min fissures appeared in the sinters while being pressed. Fissures did not appear at speeds slower than 20 mm/min. With pores left remaining after pressing at 10 mm/min, ultrafine sinters could not be produced. At slow speeds of 0.1 mm/min and under, grain growth occurred, deteriorating the mechanical strength.

Seventh Embodiment

ZnS powder of 99.9% purity and an average particle diameter of 1.2 μm was prepared as a raw material powder and was molded, in the same manner as with Embodiment 1, into disk shapes. The green bodies were sintered 9 hours at 900° C. utilizing a vacuum furnace. The relative densities of the sinters obtained were 70%. The sinters were set in a mold made of $Si_3N_4$ and of form for transferring the shape in FIG. 1. As a result of pressing, from 700° C. on in the course of raising the temperature to 950° C., at the pressing and deforming speeds set forth in Table VIII, pressing halted at the point when any of the sinters had been compressed to 60 MPa, and therefore they were then kept at that point for 10 minutes, and thereafter decompressed, lowered in temperature, and taken out of the mold. Results of measuring relative densities and mechanical strength likewise as with Embodiment 1 are set forth in Table VIII.

TABLE VIII

| No. | Pressing and deforming speed (mm/min.) | Relative density (%) | Pressure (MPa) |
| --- | --- | --- | --- |
| 45 | 3000 | — | — |
| 46 | 1000 | 90.0 | 90 |
| 47 | 700 | 99.0 | 93 |
| 48 | 490 | 99.9 | 95 |
| 49 | 260 | 99.9 | 95 |
| 50 | 144 | 99.7 | 95 |
| 51 | 50 | 99.4 | 95 |
| 52 | 30 | 99.5 | 93 |
| 53 | 15 | 99.5 | 87 |
| 54 | 6 | 99.5 | 70 |

At a pressing speed of 3000 kPa/sec fissures appeared in the sinters while being pressed. Fissures did not appear at speeds slower than 3000 kPa/sec. With pores left remaining after pressing at 1000 kPa/sec, ultrafine sinters could not be produced. At slow speeds of 15 kPa/sec and under, grain growth occurred, deteriorating the mechanical strength.

Eighth Embodiment

ZnS powder of 99.8% purity and an average particle diameter of 1.2 μm was prepared as a raw material powder and was molded, in the same manner as with Embodiment 1, into a disk shape. The green body was set into a uniaxial press with upper/lower punches made of graphite, where under a 0.15 Pa vacuum atmosphere the temperature was raised, and at 950° C. the green body was sintered 30 minutes while a pressure of 40 MPa was applied. The relative density of the sinter obtained was 99%.

Figure 4:
FIG. 4 illustrates another single example of a net shape according to the invention.

The sinter obtained was set in a mold made of graphite and of form for transferring the shape in FIG. 4, and was heated and compressed in the same way as with Embodiment 1. Here, the pressing temperature was 1000° C. A sinter of the contour in FIG. 4 could be produced as a result.

Ninth Embodiment

ZnSe powder of 99.99% or greater purity and an average particle diameter of 1 μm was prepared as a raw material powder and was molded in the same manner as with Embodiment 1. Next the green body was arranged within a uniaxial press with upper/lower punches made of graphite, where within a 0.15 Pa vacuum atmosphere the temperature was raised. It was thereafter kept at 950° C. under the same atmosphere, and then was hot-press sintered 30 minutes while applying a pressure of 40 MPa by means of the upper punch. The relative density of the sinter obtained was 99%.

Figure 5:
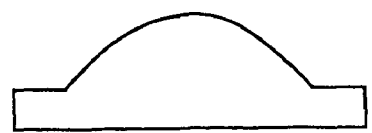
FIG. 5 illustrates another single example of a net shape according to the invention.

Utilizing a mold made of graphite and of form for transferring the shape in FIG. 5, the obtained sinter was pressed under the same heating (temperature: 1000° C.) and compression conditions as with Embodiment 1, whereupon a sinter of the contour in FIG. 5, whose main constituent was ZnSe, was produced.

Tenth Embodiment

Ge powder of 99.99% or greater purity and an average particle diameter of 2 μm was prepared as a raw material powder and was molded, in the same manner as with Embodiment 1, into a disk shape. Next the green body was arranged within a uniaxial press with upper/lower punches made of graphite, where within a 0.15 Pa vacuum atmosphere the temperature was raised. It was thereafter kept at 550° C. under the same atmosphere, and then was hot-press sintered 30 minutes while applying a pressure of 40 MPa by means of the upper punch.

Figure 6:
FIG. 6 illustrates another single example of a net shape according to the invention.

Utilizing a mold made of graphite and of form for transferring the shape in FIG. 6, the obtained sinter was pressed by heating and compressing in the same way as with Embodiment 1, apart from making 850° C. the heating temperature, whereupon a Ge sinter of the contour in FIG. 6 was produced.

Eleventh Embodiment $CaF_2$ powder of 99.5% purity and an average particle diameter of 40 μm was prepared as a raw material powder and was molded, in the same manner as with Embodiment 1, into a disk shape. Next the green body was sintered 5 hours at 500° C. utilizing a vacuum furnace. The obtained sinter was set in a mold made of SiC and of form for transferring the shape in FIG. 1, where within a 0.15 Pa vacuum atmosphere the temperature was raised to 1250° C. and maintained for 5 minutes. Then the sinter was pressed by compressing it at a speed of 20 kPa/sec, and was compressed to a final 35 MPa and kept there for 60 minutes. A sinter of the contour in FIG. 1 could be produced as a result. The post-pressing relative density was 99.9%. The transmittance at a 10 μm wavelength was 85%, while the transmittance at a 400-nm wavelength in the ultraviolet region was 50%.

INDUSTRIAL APPLICABILITY

Inasmuch as a method of manufacturing ceramic optical components according to the present invention makes it possible to press ceramic sinters into net shape and densify them at the same time, infrared- and ultraviolet-light optical components, such as window elements and lenses, of superior transmittance can be inexpensively fabricated. Likewise, inasmuch as finishing operations are performed after pressing and deforming into a near-net shape, material and processing costs can be significantly reduced over conventional methods. This means that optical components, such as window elements and lens elements, employed in high-performance infrared-light and ultraviolet-light exploiting devices can be inexpensively provided.

The invention claimed is:

1. A method of manufacturing an optical component composed of a ceramic in which one selected from ZnS, ZnSe, Ge or $CaF_2$ is the main constituent, the manufacturing method consisting essentially of:
   a molding step of either isostatically molding or die-pressing a raw-material powder of one selected from at least 97% ZnS, at least 99.99% ZnSe, at least 99.99% Ge or 99.5% $CaF_2$ into a green body;
   a sintering step of sintering said green body under conditions predetermined to render said green body into a sinter whose relative density is in the range of from 55 to 80% inclusive; and
   a compression molding step of setting said sinter into a mold made of one selected from glassy carbon, cemented carbide, SiC, $Si_3N_4$ or graphite, and in the mold pressing and deforming said sinter into a net shape, and at the same time densifying said sinter to a post-pressing relative density of at least 99%.

2. The ceramic optical component manufacturing method set forth in claim 1, wherein said compression molding step is conducted at a pressure in a range from 1 MPa to 300 MPa inclusive.

3. The ceramic optical component manufacturing method set forth in claim 1, wherein said compression molding step is conducted at a temperature that is from 30% to 100% of the melting point or the sublimation point of the green body.

4. The ceramic optical component manufacturing method set forth in claim 1, wherein said compression molding step is conducted at a pressing and deforming speed in a range of from greater than 0.1 mm/min to less than or equal to 10 mm/min.

5. The ceramic optical component manufacturing method set forth in claim 1, wherein said compression molding step is conducted at a pressing speed in a range from 15 kPa/sec to 1 MPa/sec inclusive.

6. A method of manufacturing an optical component composed of a ceramic in which one selected from ZnS, ZnSe, Ge or $CaF_2$ is the main constituent, the manufacturing method consisting essentially of:
   a molding step of either isostatically molding or die-pressing a raw-material powder of one selected from at least 97% ZnS, at least 99.99% ZnSe, at least 99.99% Ge or 99.5% CaF$_2$ into a green body;

a pressureless sintering step of sintering, without applying pressure to, said green body into a sinter whose relative density is in the range of from 55 to 80% inclusive; and a compression molding step of setting said sinter into a mold made of one selected from glassy carbon, cemented carbide, SiC, Si$_3$N$_4$ or graphite, and employing an upper ram at a pressing speed in the range of from greater than 0.1 mm/min to less than or equal to 10 mm/min, to press and deform said sinter into a net shape, and at the same time densify said sinter to a post-pressing relative density of at least 99%.

7. The ceramic optical component manufacturing method set forth in claim 6, wherein said compression molding step is conducted at a pressure in a range from 1 MPa to 300 MPa inclusive.

8. The ceramic optical component manufacturing method set forth in claim 6, wherein said compression molding step is conducted at a temperature that is from 30% to 100% of the melting point or the sublimation point of the green body.

9. The ceramic optical component manufacturing method set forth in claim 6, wherein said compression molding step is conducted at a pressing speed in a range from 15 kPa/sec to 1 MPa/sec inclusive.

10. A method of manufacturing an optical component composed of a ceramic in which one selected from ZnS, ZnSe, Ge or CaF$_2$ is the main constituent, the manufacturing method consisting essentially of:

a molding step of either isostatically molding or die-pressing a raw-material powder of one selected from at least 97% ZnS, at least 99.99% ZnSe, at least 99.99% Ge or 99.5% CaF$_2$ into a green body;

a sintering step of sintering said green body under conditions predetermined to render said green body into a sinter whose relative density is in the range of from 55 to 80% inclusive;

a compression molding step of setting said sinter into a mold made of one selected from glassy carbon, cemented carbide, SiC, Si$_3$N$_4$ or graphite, and in the mold pressing and deforming said sinter into a near-net shape, and at the same time densifying said sinter to a post-pressing relative density of at least 99%; and a finishing step of finishing said pressed and densified sinter into final form.

11. The ceramic optical component manufacturing method set forth in claim 10, wherein said compression molding step is conducted at a pressure in a range from 1 MPa to 300 MPa inclusive.

12. The ceramic optical component manufacturing method set forth in claim 10, wherein said compression molding step is conducted at a temperature that is from 30% to 100% of the melting point or the sublimation point of the green body.

13. The ceramic optical component manufacturing method set forth in claim 10, wherein said compression molding step is conducted at a pressing and deforming speed in a range of from greater than 0.1 mm/min to less than or equal to 10 mm/min.

14. The ceramic optical component manufacturing method set forth in claim 10, wherein said compression molding step is conducted at a pressing speed in a range from 15 kPa/sec to 1 MPa/sec inclusive.

15. A method of manufacturing a ZnS ceramic optical component, the manufacturing method consisting essentially of:

a molding step of either isostatically molding or die-pressing into a green body a ceramic raw-material powder whose main constituent is ZnS;

a sintering step of sintering said green body under conditions predetermined to render said green body into a near-net shape sinter whose relative density is from 55 to 80% inclusive; and a compression molding step of setting said sinter into a mold made of glassy carbon, and in the mold pressing said sinter, at a pressing temperature of from 600° C. to 1150° C., to deform said sinter into a net shape and at the same time densify said sinter to a post-pressing relative density of at least 99%.

16. A method of manufacturing a ZnS ceramic optical component, the manufacturing method consisting essentially of:

a molding step of either isostatically molding or die-pressing into a green body a ceramic raw-material powder whose main constituent is ZnS;

a sintering step of sintering said green body under conditions predetermined to render said green body into a near-net shape sinter whose relative density is from 55 to 80% inclusive; and a compression molding step of setting said sinter into a mold made of one selected from glassy carbon, cemented carbide, SiC, Si$_3$N$_4$ or graphite, and in the mold pressing said sinter to deform and at the same time densify it into a finished, net-shape sinter whose post-pressing relative density is at least 99%, and 0.01 to 1.0 wt % of the entirety of which is components other than ZnS.

17. A method of manufacturing a ZnS ceramic optical component, the manufacturing method consisting essentially of:

a molding step of either isostatically molding or die-pressing into a green body a ceramic raw-material powder whose main constituent is ZnS;

a sintering step of sintering said green body under conditions predetermined to render said green body into a near-net shape sinter whose relative density is from 55 to 80% inclusive; and a compression molding step of setting said sinter into a mold made of one selected from glassy carbon, cemented carbide, SiC, Si$_3$N$_4$ or graphite, and in the mold pressing said sinter to deform and at the same time densify it into a finished, net-shape sinter whose post-pressing relative density is at least 99%, and having a transmittance of $\geq$70% at a wavelength of 10 μm.

18. A method of manufacturing a ZnS ceramic optical component, the manufacturing method consisting essentially of:

a molding step of either isostatically molding or die-pressing into a green body a ceramic raw-material powder whose main constituent is ZnS;

a sintering step of sintering said green body under conditions predetermined to render said green body into a near-net shape sinter whose relative density is from 55 to 80% inclusive; and a compression molding step of setting said sinter into a mold made of one selected from glassy carbon, cemented carbide, SiC, Si$_3$N$_4$ or graphite, and in the mold pressing and deforming said sinter at a pressing speed s in the range 0.1 mm/min $<s\leq$10 mm/min into a finished, net-shape sinter whose post-pressing relative density is at least 99%, and having a transmittance of $\geq$70% at a wavelength of 10 μm.

19. A method of manufacturing a ZnS ceramic optical component, the manufacturing method consisting essentially of:
- a molding step of either isostatically molding or die-pressing into a green body a ceramic raw-material powder whose main constituent is ZnS;
- a sintering step of sintering said green body under conditions predetermined to render said green body into a near-net shape sinter whose relative density is from 55 to 80% inclusive; and
- a compression molding step of setting said sinter into a mold made of one selected from glassy carbon, cemented carbide, SiC, $Si_3N_4$ or graphite, and in the mold heating said sinter to a temperature that is greater than or equal to 30% of the melting/sublimation point of said sinter, and before the finally attained temperature is reached, initiating pressing of said sinter to deform it into a finished, net-shape sinter whose post-pressing relative density is at least 99%.

20. A method of manufacturing a ZnS ceramic optical component, the manufacturing method consisting essentially of:
- a molding step of either isostatically molding or die-pressing into a green body a ceramic raw-material powder whose main constituent is ZnS;
- a sintering step of sintering said green body under conditions predetermined to render said green body into a near-net shape sinter whose relative density is from 55 to 80% inclusive; and
- a compression molding step of setting said sinter into a mold made of one selected from glassy carbon, cemented carbide, SiC, $Si_3N_4$ or graphite, and in the mold pressing said sinter to deform and at the same time densify it into a finished, net-shape sinter whose post-pressing relative density is at least 99%, 0.01 to 1.0 wt % of the entirety of which is components other than ZnS, and having a transmittance of $\geq$70% at a wavelength of 10 μm.

21. A method of manufacturing an optical component composed of a ceramic in which one selected from ZnS, ZnSe, Ge or $CaF_2$ is the main constituent, the manufacturing method consisting essentially of:
- a molding step of either isostatically molding or die-pressing a raw-material powder of one selected from at least 97% ZnS, at least 99.99% ZnSe, at least 99.99% Ge or 99.5% $CaF_2$ into a green body;
- a sintering step of sintering said green body under conditions predetermined to render said green body into a sinter whose relative density is in the range of from 55 to 80% inclusive; and
- a compression molding step of setting said sinter into a mold made of one selected from glassy carbon, cemented carbide, SiC, $Si_3N_4$ or graphite, and in the mold pressing and deforming said sinter into a net shape, and at the same time densifying said sinter to a post-pressing relative density of at least 99%, by means of unixial pressing in which an upper ram is employed.

22. The ceramic optical component manufacturing method set forth in claim 21, wherein said compression molding step is conducted at a pressing and deforming speed of from 0.1 mm/min to 10 mm/min.

23. The ceramic optical component manufacturing method set forth in claim 21, wherein in said compression molding step the pressure is elevated at a rate of from 15 kPa/s to 1 MPa/s.

* * * * *